US00RE45191E

(19) United States
(12) Reissued Patent
Jin et al.

(10) Patent Number: US RE45,191 E
(45) Date of Reissued Patent: Oct. 14, 2014

(54) METHOD OF MANAGING USER KEY FOR BROADCAST ENCRYPTION

(71) Applicant: Samsung Electronics Co., Ltd., Suwon-si (KR)

(72) Inventors: Weon-il Jin, Suwon-si (KR); Dae-youb Kim, Seoul (KR); Hwan-joon Kim, Seoul (KR); Sung-joon Park, Seoul (KR); Jung-hee Cheon, Seoul (KR); Myung-hwan Kim, Seoul (KR); Nam-su Jho, Seoul (KR); Eun-sun Yoo, Namyangju-si (KR)

(73) Assignee: Samsung Electronics Co., Ltd., Suwon-si (KR)

(21) Appl. No.: 13/865,725

(22) Filed: Apr. 18, 2013

Related U.S. Patent Documents

Reissue of:
(64) Patent No.: 7,929,705
Issued: Apr. 19, 2011
Appl. No.: 11/271,989
Filed: Nov. 14, 2005

(30) Foreign Application Priority Data

Nov. 12, 2004 (KR) ..... 10-2004-0092431
Oct. 25, 2005 (KR) ..... 10-2005-0100726
Nov. 8, 2005 (KR) ..... 10-2005-0106604

(51) Int. Cl.
*H04L 9/08* (2006.01)

(52) U.S. Cl.
USPC ..... 380/278

(58) Field of Classification Search
None
See application file for complete search history.

(56) References Cited

U.S. PATENT DOCUMENTS

| | | | |
|---|---|---|---|
| 5,592,552 | A | 1/1997 | Fiat |
| 5,796,839 | A | 8/1998 | Ishiguro |
| 6,028,933 | A | 2/2000 | Heer et al. |
| 6,397,329 | B1 | 5/2002 | Aiella et al. |
| 6,735,313 | B1 | 5/2004 | Bleichenbacher et al. |
| 6,799,270 | B1 | 9/2004 | Bull et al. |
| 6,816,595 | B1 | 11/2004 | Kudo |
| 7,010,125 | B2 | 3/2006 | Lotspiech et al. |
| 2002/0133701 | A1 | 9/2002 | Lotspiech et al. |
| 2003/0044017 | A1 | 3/2003 | Briscoe |

FOREIGN PATENT DOCUMENTS

| | | | |
|---|---|---|---|
| CN | 1 273 490 | | 11/2000 |
| CN | 1273490 | A | 11/2000 |
| JP | 10-3256 | A | 1/1998 |
| JP | 2004-527937 | A | 9/2004 |

OTHER PUBLICATIONS

Partial European Search Report issued Jun. 11, 2013 in corresponding European Application No. 13165231.5.

(Continued)

*Primary Examiner* — Brandon Hoffman
(74) *Attorney, Agent, or Firm* — NSIP Law

(57) ABSTRACT

A user key management method for a broadcast encryption includes assigning node path identifiers (IDs) to nodes arranged in sequence; assigning random seed value keys to the nodes according to the node path IDs; generating key values by repeatedly applying a hash function to the assigned random seed value keys; and assigning the generated key values to the nodes in sequence. Accordingly, it is possible to reduce the transmission overhead that is most important matter in the broadcast encryption to less than the number of the revoked users. Further, there is an advantage that the transmission overhead of the exemplary embodiments of the present invention is remarkably reduced compared with the Subset Difference method.

51 Claims, 11 Drawing Sheets

(56) References Cited

OTHER PUBLICATIONS

Japanese Office Action issued Aug. 13, 2013 in corresponding Japanese Application No. JP 2011-082596. (8 pages, in Japanese, with complete English translation).
Japanese Office Action issued Aug. 13, 2013 in corresponding Japanese Application No. JP 2012-134570. (7 pages, in Japanese, with complete English translation).
Nojima, et al., 'Ichihokosei Kansu ni yoru Ki Kozo Kagi Kanri Hoshiki no Koritsuka. (Efficient Tree-based Key Management Using One-way Functions)' 2004 Nen Ango To Joho Security Symposium Yokoshu vol. I of II, Jan. 27, 2004, pp. 189-194, XP002996770. (16 pages, in Japanese, with complete English translation).
Extended European Search Report issued May 8, 2014 in counterpart European Application No. 13165231.5 (16 pages).
Perrig, Adrian, et al. "SPINS: Security protocols for sensor networks." Annual International Conference on Mobile Computing and Networking, XP-001072004, (2001): (pp. 189-199).
Hu, Yih-Chun, et al. "SEAD: Secure efficient distance vector routing for mobile wireless ad hoc networks." Proceedings of the Fourth IEEE Workshop on Mobile Computing Systems and Appliations, XP-010592539, (2002): (11 pages).
Zapata, Manel Guerrero, et al. "Securing ad hoc routing protocols." Proceedings of the 2002 ACM workshop on Wireless security. ACM, XP-001047058, 2002 (10 pages).

701

| | | | | | | | | | |
|---|---|---|---|---|---|---|---|---|---|
| – | – | – | ··· | – | – | | $K_{c+1,c+1}$ | ··· | $K_{c+1,2c-1}$ |
| – | – | – | ··· | – | – | $K_{c,c}$ | $K_{c,c+1}$ | ··· | $K_{c,2c-1}$ |
| – | – | – | ··· | – | $K_{c-1,c-1}$ | $K_{c-1,c}$ | $K_{c-1,c+1}$ | ··· | – |
| – | – | – | ··· | $K_{c-2,c-2}$ | $K_{c-2,c-1}$ | $K_{c-2,c}$ | $K_{c-2,c+1}$ | ··· | – |
| ··· | ··· | ··· | ··· | ··· | ··· | ··· | ··· | ··· | ··· |
| – | – | $K_{3,3}$ | ··· | $K_{3,c-2}$ | $K_{3,c-1}$ | $K_{1,c}$ | $K_{3,c+1}$ | ··· | – |
| – | $K_{2,2}$ | $K_{2,3}$ | ··· | $K_{2,c-2}$ | $K_{2,c-1}$ | $K_{1,c}$ | $K_{2,c+1}$ | ··· | – |
| $K_{1,1}$ | $K_{1,2}$ | $K_{1,3}$ | ··· | $K_{1,c-2}$ | $K_{1,c-1}$ | $K_{1,c}$ | – | ··· | – |
| 1 | 2 | 3 | ··· | c-2 | c-1 | c | c+1 | ··· | 2c-1 |

KEYS OF USER $u_c$

FIG. 18

| | | | | | | | | | |
|---|---|---|---|---|---|---|---|---|---|
| $K_{10.2}$ | $K_{10.3}$ | $K_{10.4}$ | $K_{10.5}$ | | | | | | $K_{10.1}$ |
| $K_{9.3}$ | $K_{9.4}$ | $K_{9.5}$ | | | | | | $K_{9.1}$ | $K_{9.2}$ |
| $K_{8.4}$ | $K_{8.5}$ | | | | | | $K_{8.1}$ | $K_{8.2}$ | $K_{8.3}$ |
| $K_{7.5}$ | | | | | | $K_{7.1}$ | $K_{7.2}$ | $K_{7.3}$ | $K_{7.4}$ |
| | | | | | $K_{6.1}$ | $K_{6.2}$ | $K_{6.3}$ | $K_{6.4}$ | $K_{6.5}$ |
| | | | | $K_{5.1}$ | $K_{5.2}$ | $K_{5.3}$ | $K_{5.4}$ | $K_{5.5}$ | |
| | | | $K_{4.1}$ | $K_{4.2}$ | $K_{4.3}$ | $K_{4.4}$ | $K_{4.5}$ | | |
| | | $K_{3.1}$ | $K_{3.2}$ | $K_{3.3}$ | $K_{3.4}$ | $K_{3.5}$ | | | |
| | $K_{2.1}$ | $K_{2.2}$ | $K_{2.3}$ | $K_{2.4}$ | $K_{2.5}$ | | | | |
| $K_{1.1}$ | $K_{1.2}$ | $K_{1.3}$ | $K_{1.4}$ | $K_{1.5}$ | | | | | |
| 1 | 2 | 3 | 4 | 5 | 6 | 7 | 8 | 9 | 10 |

METHOD OF MANAGING USER KEY FOR BROADCAST ENCRYPTION

Matter enclosed in heavy brackets [ ] appears in the original patent but forms no part of this reissue specification; matter printed in italics indicates the additions made by reissue.

*CROSS REFERENCE TO RELATED APPLICATION(S)*

*Notice: More than one reissue application has been filed for a reissue of U.S. Pat. No. 7,929,705. The reissue applications are Reissue application Ser. No. 13/865,725 (the present reissue application), which is for a reissue of U.S. Pat. No. 7,929,705, and Reissue Continuation application Ser. No. 13/867,150, which is a reissue continuation of Reissue application Ser. No. 13/865,725, and is also a reissue of U.S. Pat. No. 7,929,705.*

This *reissue* application is a *Reissue Application from U.S. Pat. No. 7,929,705 issued on Apr. 19, 2011 and filed Nov. 14, 2005, which* claims priority *under 35 U.S.C. §119(a)* from Korean Patent Application Nos. 2004-92431, 2005-106604 and 2005-100726, filed on Nov. 12, 2004, Nov. 8, 2005 and Oct. 25, 2005, respectively, [the entire content of which is incorporated herein by reference] *the entire disclosures of each of which are incorporated herein by reference for all purposes.*

BACKGROUND OF THE INVENTION

1. Field of the Invention

Methods consistent with the present invention relate to broadcast encryption, and more specifically, to managing a user key for a broadcast encryption.

2. Description of the Related Art

Broadcast encryption (BE) is used for a sender (that is, a broadcast center) to efficiently transmit information to only intended users among all users. This scheme should be effectively used when a set of users receiving the information changes randomly and dynamically. In BE, the most important issue is to revoke or exclude disapproved users (for example, revoked users or expired users).

FIG. 1 is a conceptual view showing a network construction of a data transmission system in which a general broadcast encryption scheme is used. Referring to FIG. 1, a contents producer 100 produces various kinds of available contents of data, including audio or video data, and provides a service provider 110 with the produced contents of data. The service provider 110 broadcasts the contents of data provided from the contents producer 100 to privileged users (for example, a mobile Digital Right Management (DRM) network 140 and a smart home DRM network 150) who paid for corresponding contents of data provided through various kinds of wired or wireless communication networks.

That is, the service provider 110 can transmit the data to a user apparatus such as a set-top box 141 equipped with various kinds of satellite receivers via a satellite 120 and also to a mobile communication terminal 142 through a mobile communication network. Further, the provider 110 can transmit the data to various kinds of terminals 150, 151, 152, 153, 154 and 155 in the smart home DRM network 150 through an Internet network 130.

Meanwhile, at this time, in order to keep revoked users 160 who have not paid for using the data, the data is encrypted by using the broadcast encryption scheme.

Security in such an encryption/decryption system generally depends on an encryption key management scheme. Further, in such an encryption key management scheme, the most important matter is how to derive the encryption key. At the same time, it is also important to manage and update the derived encryption keys.

There have been many changes in BE since the concept was first proposed in 1991, and it is assumed that users are stateless in current BE schemes. This means that secret keys of each user are never changed or updated even though sessions change. By the way, the term "k-resilient" is used for security, which means that the revoked users cannot recover the data although k revoked users among all the revoked users collude. If r is the number of the revoked users, the term "r-resilient" means that there is no problem in security although all of the revoked users collude.

Meanwhile, another main issue of BE is to minimize transmission overhead, storage overhead and computation overhead, which means the length of headers to be transmitted by a sender, the size of user keys and the computing time of computations for a user to obtain a session key, respectively. Among them, in particular, the most important issue is to reduce the transmission overhead. While the transmission overhead was proportional to N which is the number of total users, these days it is generally and currently proportional to the number of the revoked users r. Accordingly the transmission overhead is reduced as r decreases. As schemes in which the transmission overhead is proportional to r have been developed, it became an important issue to reduce the transmission overhead down to less than r.

Among the published BE schemes, it is known that a Subset Difference (SD) method (or model) by D. Naor, M. Naor and J. Lotspiech shows the best efficiency. In the SD method, storage overhead is $O(\log^{3/2} n)$ and transmission overhead is $O(2r-1)$ when the number of total users is n.

However, the SD method also is disadvantageous in efficiency when there are a number of users.

As described above, various algorithms have been proposed since 1991. Among them, a secret sharing scheme, a subset cover-free system model scheme and a tree-structure based scheme are important ones.

First, a secret key sharing model will be schematically described below. The secret key sharing model was proposed by S. Berkovits in 1991, and improvement thereof is made in a paper entitled "Efficient Trace and Revoke Schemes" published by M. Noar and B. Pinkas in 2000. A polynomial interpolation method and a vector-based secret key sharing method were proposed in a paper entitled "How to Broadcast a Secret" by S. Berkovits.

In the polynomial interpolation method, a center (that is, a broadcast center or a sender) transmits a point $(x_i, y_i)$ to each user over a secret channel. At this time, all of the Xi are different from each other and the point $(x_i, y_i)$ is a secret key of each user. Then, in order for a center to broadcast secret information S to t privileged users by a session, t+j+1 degree of a polynomial P and a random integer j are selected. The polynomial P is a polynomial expression on the points $(x_i, y_i)$ which are the secret keys of privileged users, randomly selected j points (x, y) that are not secret keys of any other privileged users and a point (O, S). Further, the center transmits any points which are on the polynomial P but not included in the (t+j) points. Then, since the t privileged users know one more point (their own secret key) other than the (t+j) points, they can obtain the t+j+1 degree of polynomial P and also decrypt the secret information S. However, the revoked users know only (t+j) points, so that they can not obtain the polynomial P.

This method has transmission overhead of O(t+j+1), storage overhead of O(1), and computation overhead of $t^3$ times of computations, approximately. Therefore, the method has advantages that it is easy to revoke unprivileged users and keep the revoked users from colluding, and further traitor tracing is possible. However, this method has also a disadvantage that it cannot be practically used since it is not efficient for a large group of users and security becomes weaker after the method is repeatedly used many times. A threshold secret sharing scheme using the Lagrange's interpolation formula is used in schemes proposed in a paper entitled "Efficient Trace and Revoke Schemes" by M. Noar and B. Pinkas. The schemes proposed by Noar-Pinkas use an idea that a polygonal expression of (r+1) degree can be recovered using (r+1) points on the polynomial of (r+1) degree but cannot be recovered with r points that lack one point to recover the polynomial of (r+1) degree. That is, the center selects arbitrary polynomial P of t degree and gives each user with each different point on the polynomial P as a secret key. When r users are revoked, the center transmits t total points, that is, r secret keys, which are r revoked users' keys, and (t−r) points selected arbitrarily to the revoked users. As a result, since revoked users know only t points, including his/her secret key, the revoked users can not recover the polynomial P. Meanwhile, since a user who is not revoked knows (t+1) points, the user can recover the polynomial P. By this polynomial P, a session key P(0) is obtained.

This method has advantages that revocation is also easy and it is possible to keep revoked users from colluding. Further, it has remarkable advantages that it is possible to add new users and has a quite good efficiency of the transmission overhead O(t) and the storage overhead O(1). However, this method also has a problem that it is impossible to revoke more users than t which is the initially determined number. Furthermore, this method is sometimes inefficient in many cases, since the number of points to be transmitted and the computation overhead to compute a polynomial depend on the t. Still further, since the computing time dramatically increases as t becomes greater, this scheme is not proper in a case that there are a number of users.

Secondly, a subset cover-free system model can be applied when a set of total users S comprises a plurality of subsets. BE can be performed by using the subset cover-free system. However, the system is not efficient because the storage overhead and transmission overhead become about O(r log n). Further, a k-resilient model is proposed by expanding a 1-resilient model. Since effective 1-resilient technique can be easily devised such expansion seems to be meaningful, but efficiency is quite degraded during the expansion procedure using the methods known until now.

Thirdly, tree-structure based methods are recently attracting public attention. Although C. K. Wong, M. Gouda and G. S. Lam proposed a logical-tree-hierarchy (LTH) method in 1998, it was hard to revoke a number of users in one session. Further, since user secret keys change as the sessions change in this method, it is not applicable to up-to-data BE which assumes that receivers are stateless. Later, D. Naor, M. Noar and J. Lotspiech proposed a Complete Subset (CS) Cover scheme and the SD scheme in 2001. In both methods, given that n is the number of total users and r is the number of revoked users, a center constructs a binary tree with the height (log n) and assigns secret keys to each node in the binary tree. Further, each node is assigned each user.

First, considering a CS Cover Scheme, each user receives all secret keys of the nodes located on its path starting from the root node to its own leaf from a center, and stores them. Here, a sub-tree including no revoked user is called a CS. At this time, it is possible to form a tree structure that does not include any revoked users, by gathering the CSs properly. When a center encrypts each session key by using each secret key of the root nodes of the CSs and transmits the encrypted session keys to corresponding CSs, privileged users can recover the session keys but the revoked users cannot recover the session keys since they are not included in any of the CSs.

FIG. 2 is a tree structure showing a concept of a broadcast encryption in which key distribution method follows the related art of the tree-structure based model. Referring to FIG. 2, a set of users 220 arranged onto corresponding nodes 32 to 47, respectively, receives data encrypted by using a broadcast encryption scheme. The users on their nodes 32 to 47 have their unique keys, respectively, along with keys of all of the nodes linked with their nodes, respectively in the tree-structure.

For example, the user on the node 34 has keys of the node 17, the node 8, the node 4 and the node 2 as well as his/her own key. That is, the key of the node 17, which is given to the user on the node 34, is shared with the user on the node 35. In the same manner, the key of the node 8, which is also given to the user on the node 34, is shared with the users on the nodes 32, 33, 35.

Meanwhile, in a case that all of the users on the nodes 32 to 47 are privileged, data transmission can be performed maintaining the data secrecy by transmitting the same data with a header which contains the key of the node 2 to all of the users.

However, if a user having the key originally assigned to the user 221 on the node 36 is a revoked user, since the key of the user 221 is shared with other users all of the keys in relation with the key of the user 221 should be updated. That is, the keys of the node 18, the node 9, the node 4 and the node 2 should be updated. At this time, the update of the keys is progressed upward from the lowest level nodes to the highest level nodes.

First, since the key of the node 18 corresponding to the user 210 is shared with the user on the node 37, the updated key of the node 18 corresponding to the user 210 is encrypted and transmitted to the user of the node 37 by the center. The key of the node 9 corresponding to the user 205 is shared with the user on the node 37, the users of the nodes 38 and 39 located in the lower level of the node 19 corresponding to the user 211. Accordingly, when applying the updated key of the user 205 on the node 9 to the nodes 37, 38 and 39 in a lower level, the previously updated key of the user 210 on the node 18 will be encrypted and transmitted to the user on the node 37. Meanwhile, the updated key of the node 19 will be encrypted and transmitted to the users on the nodes 38 and 39.

In the same manner, since the key of the node 4 corresponding to the user 202 is shared with the users on the nodes 32 to 35, which are downstream nodes of the node 8 corresponding to the user 204, and the users on the nodes 37 to 39 which are downstream nodes of the node 9 corresponding to the user 205, to apply the previously updated key of the node 4 corresponding to the user 202 to the nodes 32 to 35, the updated key of the node 8 corresponding to the user 204 is encrypted and transmitted to the nodes 32 to 35. Meanwhile, the updated key of the node 9 corresponding to the user 205 is encrypted and transmitted to the nodes 37 to 39.

Finally, since the key of the node 2 corresponding to the user 201 is shared with the users on the nodes 32 to 35 and 37 to 39, which are downstream nodes of the node 4 corresponding to the user 202, and the users on the nodes 42 to 47 which are downstream nodes of the node 5 corresponding to the user 203, to apply the previously updated key of the node 2 corresponding to the user 201 to the nodes 32 to 35, 37 to 39 and 42 to 47, the updated key of the node 4 corresponding to the user 202 is encrypted and transmitted to the nodes 32 to 35 and 37 to 39. Meanwhile, the updated key of the node 5 corresponding to the user 203 is encrypted and transmitted to the nodes 40 to 47. By this key update procedure, it is possible to keep the revoked user (or the expired user) from accessing the broadcasted data.

The transmission overhead in this CS model is the number of the all of CSs, O(r log(n/r)), in which the CSs do not include any revoked users. Further, the storage overhead is O(log n).

Meanwhile, the SD model is a modification of the CS model described above, and has remarkably improved the transmission overhead. That is, the transmission overhead is O(2r−1) and the storage size is O ($\log^2$n) in the SD method. In the SD model, it is assumed that there is a first sub-tree rooted at a node v. The sub-tree has a node w which also serves as the root of a second sub-tree. At this time, we can consider a third sub-tree including set of all leaves in the first sub-tree rooted at the node v but not including leaves in the second sub-tree rooted at the node w. All leaves in the third sub-tree are regarded as privileged users and all leaves in the second sub-tree are regarded as revoked users. In a case that there is a set of users including the reasonable number of privileged users and a small number of revoked users, only one-sub set is needed for this SD method unlike the CS method in which at least two sub-sets are needed. In the SD method, a hash value of keys assigned the nodes hanging off the path between the node v to the node w are obtained is obtained and the obtained hash value is used as a session key. That is, each node has a hash value of a sibling node of each node hanging off the path between the root node and his/her own node as a secret key. Accordingly, only privileged users can recover the session key due to the uni-directional property of the hash function. At this time, the transmission overhead of the SD model is 0(2r−1) at most, and the storage overhead of is 0($\log^2$n), and the computation overhead of it is maximum 0(log n).

Thereafter, an LSD model improved from the SD model was proposed in 2002. In the LSD model, the storage overhead is reduced to 0($\log^{3/2}$n) by applying a layer-structure to each sub-tree, but the transmission overhead becomes twice as much as that of the SD model.

The models with the best efficiency among the BE models described above are the tree-structure based modes, such as LSD, SD and the like. However, since the number of subsets needed for the broadcast in the method based on the tree-structure considerably depends on positions of the users further remarkable improvement is not expected. Further, the tree-structure based BE models have a drawback that they requires considerable amount of maintenance cost. Accordingly, more efficient BE models other than the tree-structure based models described above are demanded.

SUMMARY OF THE INVENTION

An aspect of the present invention is to provide a method of managing a user key for a broadcast encryption, which sequentially constructs one-way key chains with respect to each node in sequence and distributing keys by use of a straight line structure.

Another aspect of the present invention is to provide a method of managing a user key for a broadcast encryption, which marks every c-th node among all nodes on a straight line and then setting the marked nodes as special nodes, and generates a special node chain starting from a special node key.

Yet another aspect of the present invention is to provide a method of managing a user key for a broadcast encryption, capable of reducing transmission overhead by setting an interval by defining the interval to include one revoked user.

According to an aspect of the present invention, there is provided a method of managing a user key for a broadcast encryption, includes assigning node path identifiers (IDs) to nodes arranged in sequence; assigning random seed value keys to the nodes according to the node path IDs; generating key values by repeatedly applying a hash function to the assigned random seed value keys; and assigning the generated key values to the nodes in sequence.

An encryption key for an interval constructed with N-ary nodes which are arranged in sequence may be generated by repeatedly applying the hash function N−1 times to the seed value key which is assigned to a first node in the interval.

The interval may be a set of consecutive non-revoked nodes.

The interval may include more than one revoked node and apply an independent hash function to the revoked node.

According to an aspect of the present invention, there is provided a method of managing a user key for a broadcast encryption, includes assigning random seed value keys to nodes sequentially arranged; generating key values by repeatedly applying a first hash function to the assigned random seed value keys; assigning the generated key values to the nodes in sequence; setting special nodes in a certain interval among the sequentially arranged nodes; assigning special seed value keys to the special nodes; generating key values by repeatedly applying a second hash function to the assigned special seed value keys; and assigning the generated key values to the special nodes in sequence.

When a special node key K is assigned to a first special node of the special nodes, a key value which is obtained by applying the second hash function to the special node key K may be assigned to a second special node located away from the first special node in the certain interval.

An encryption key for an interval constructed with N-ary nodes which are arranged in sequence may be generated by repeatedly applying the hash function N−1 times to the seed value key which is assigned to a first node in the certain interval.

The interval may be a set of consecutive non-revoked nodes.

The interval may include more than one revoked node and applies an independent hash function to the revoked node.

According to an aspect of the present invention, there is provided a method of managing a user key for a broadcast encryption, include assigning node path identifiers (IDs) to nodes configuring a circular group; assigning random seed value keys to the nodes according to the node path IDs; generating key values by repeatedly applying a hash function to the assigned random seed value keys; and assigning the generated key values to the nodes in the circular group in a cyclic way.

An encryption key for a cyclic interval constructed with N-ary nodes in the circular group may be generated by repeatedly applying the hash function N−1 times to the seed value key which is assigned to a first node in the interval.

The cyclic interval may be a set of consecutive non-revoked nodes.

A layered structure of circular groups may be constructed by linking nodes configuring a new circular group to below each node configuring the circular group.

The layered structure may have 16 layers.

The number of nodes in the respective circular groups may be identical.

The cyclic interval constructed with the N-ary nodes in the circular group may include more than one revoked node and apply an independent hash function to the revoked node.

N-ary nodes may construct the circular group and be assigned the node path IDs from 0 to N−1.

A node having at least one revoked node may be regarded as a revoked node in the layered structure.

According to an aspect of the present invention, there is provided a method of managing a user key for a broadcast encryption, includes assigning random seed value keys to nodes constructing a circular group; generating key values by repeatedly applying a first hash function to the assigned random seed value keys; assigning the generated key values to the nodes constructing the circular group in a cyclic way; setting special nodes in a certain interval among the nodes constructing the circular group; assigning random special seed value keys to the special nodes; generating key values by repeatedly applying a second hash function to the assigned random seed value keys; and assigning the generated key values to the special nodes in a cyclic way.

When a special node key K is assigned to a first special node of the special nodes, a key value which may obtained by applying the second hash function to the special node key K is assigned to a second special node located away from the first special node at the certain interval.

An encryption key for an interval constructed with N-ary nodes which are arranged in sequence may be generated by repeatedly applying the hash function N−1 times to the seed value key which is assigned to a first node in the interval.

The cyclic interval may be a set of consecutive non-revoked nodes.

The cyclic interval may include more than one revoked node and apply an independent hash function to the revoked node.

BRIEF DESCRIPTION OF THE DRAWINGS

The above and/or other aspects of the present invention will be more apparent by describing certain exemplary embodiments of the present invention with reference to the accompanying drawings, in which:

FIG. 18 is a view showing a method of assigning keys to each node on a circular structure in accordance with a fourth modified exemplary embodiment of the present invention.

DETAILED DESCRIPTION OF THE EXEMPLARY EMBODIMENTS

Certain exemplary embodiments of the present invention will be described in greater detail with reference to the accompanying drawings.

Basic Exemplary Embodiment

Figure 1:
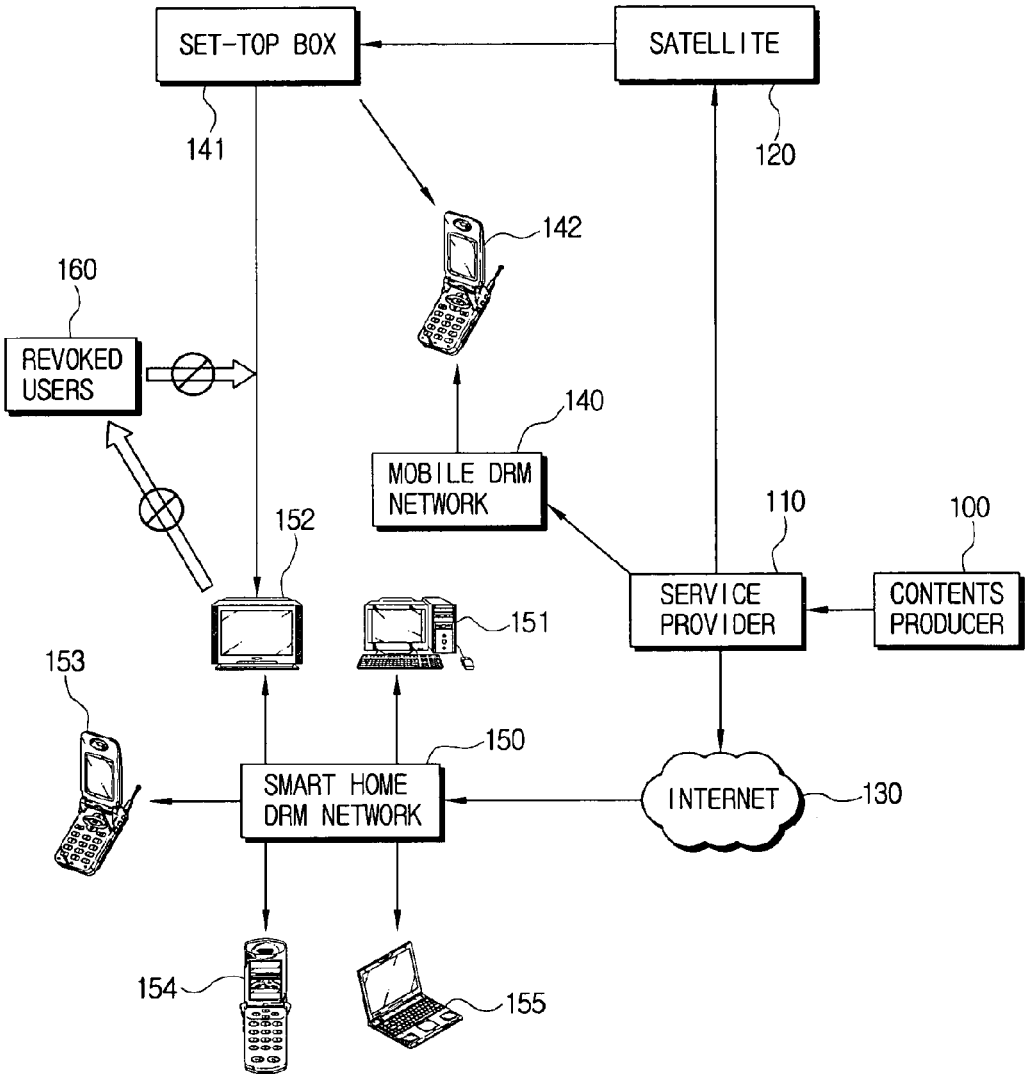
FIG. 1 (PRIOR ART)
FIG. 1 is a conceptual view showing a network construction of a data transmission system where a general broadcast encryption scheme is used.
Figure 2:
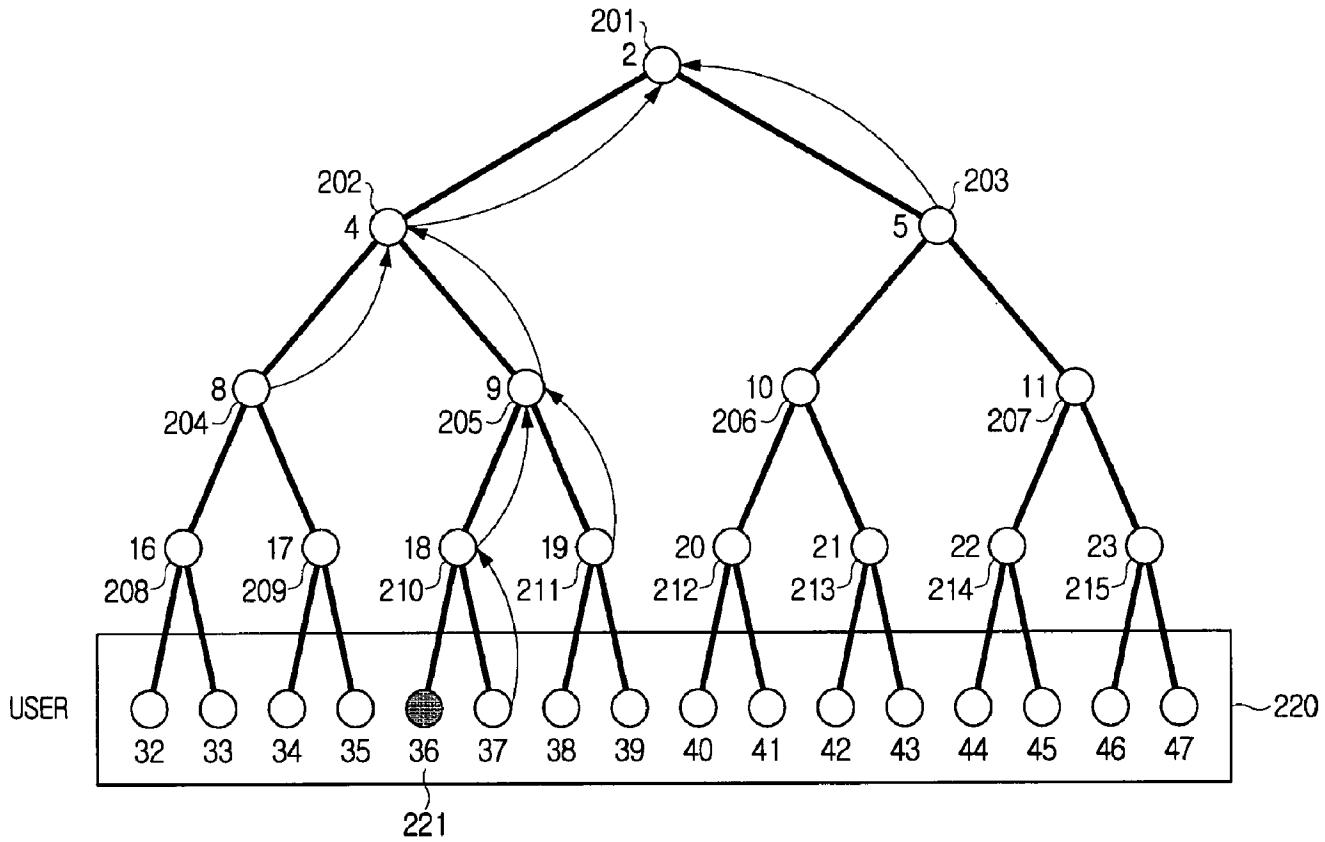
FIG. 2 (PRIOR ART)
FIG. 2 is a tree structure showing a concept of a broadcast encryption to assign keys in accordance with the related art.
Figure 3:
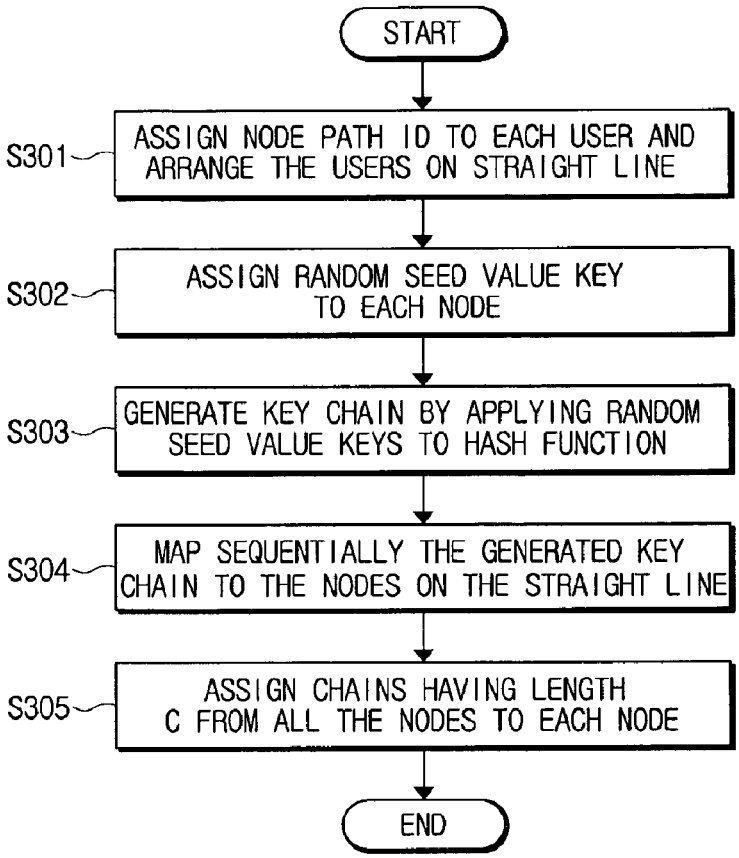
FIG. 3 is a flow chart showing a procedure of assigning keys by mapping a one-way key chain on each node in accordance with an exemplary embodiment of the present invention.

FIG. 3 is a flow chart showing a procedure of assigning keys by mapping a one-way key chain onto each node of a straight line structure in accordance with an exemplary embodiment of the present invention. Referring to FIG. 3, a node path identification (ID) is assigned to each node (S301). The node path ID is used to identify each user corresponding to each node.

Next, a random seed value key is assigned to each node on the straight line structure according to its node path ID (S302). In an exemplary embodiment of the present invention, the random seed value key can be independently determined.

A key value is generated by applying a one-way hash function to the random seed value key assigned to each node.

The one-way hash function is repeatedly applied to the generated key value to thus generate consecutive key values. Next, key (hash) chains according to the respective random seed value keys are generated (S303).

Herein, the one-way hash function is a function which transforms an arbitrary-length input value into a fixed-length output value. The one-way hash function has the following properties: (1) it is impossible to calculate an original input value from a given output value, (2) it is impossible to find another input value which can produce the same output value as a given input value, and (3) it is impossible to find two different input values which produce the same output value.

As mentioned above, such a hash function is one of crucial functions applied for data integrity, authentication, and non-repudiation. In an exemplary embodiment of the present invention, the one-way hash function can be "HBES SHA-1".

Next, the key values generated from the respective seed value keys at operation S303 are sequentially assigned to nodes starting from a next node of the nodes assigned the respective seed value keys (S304, S305). In an exemplary embodiment of the present invention, the direction of assigning the key values should be uniform for each device.

Hereinafter, the key distribution procedure will be described in more detail with reference to FIGS. 4 to 6.

Figure 4:
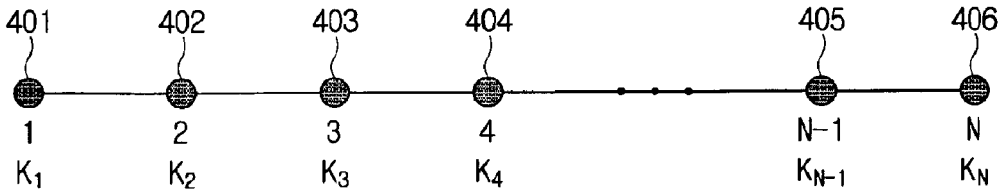
FIG. 4 is a view showing a method of assigning a random seed value key to each node on a straight line structure in accordance of an exemplary embodiment of the present invention.

FIG. 4 illustrates a method of assigning a random key to each node on a straight line structure in accordance with an exemplary embodiment of the present invention. Referring to FIG. 4, a random seed value keys can be mapped to each node on a straight line one by one from the first node.

For example, assuming N nodes are arranged on the straight line, the nodes are assigned randomly selected seed value keys $K_1, K_2, \ldots, K_N$, respectively. That is, a first node 401 is assigned the key $K_1$, a second node 402 is assigned the key $K_2$, a third node 403 is assigned the key $K_3$, a fourth node 404 is assigned the key $K_4$, . . . an (N−1)-th node 405 is assigned the key $K_{N-1}$, and an N-th node 406 is assigned the key $K_N$, where the $K_1$ to $K_N$ are randomly selected.

The one-way key chains are constructed by applying a one-way hash function to the seed value key. A method of constructing the one-way key chains is as follows.

Let h be a one-way hash function $\{0,1\}^{128} \rightarrow \{0,1\}^{128}$. A one-way key chain with th length c starting from the key K is $\{K, h(K), h(h(K))=h^{(2)}(K), \ldots, h^{(c-1)}(K)\}$. The keys in the constructed one-way key chain are sequentially assigned the respective nodes on the straight line.

Figure 5:
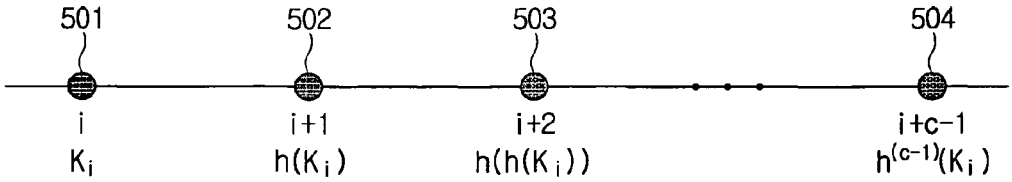
FIG. 5 is a view showing a method of mapping a one-way key chain to each node on a straight line structure in accordance with an exemplary embodiment of the present invention.

FIG. 5 illustrates a method of mapping the one-way key chain to each node on the straight line structure in accordance with an exemplary embodiment of the present invention. Referring to FIG. 5, the one-way key chains with the length c starting from each node key are constructed by applying the one-way hash function h to each key and the keys in the constructed one-way key chain are mapped onto each node. Here, c denotes the chain size.

Accordingly, an i-th node 501 is mapped with a seed value key K, an (i+1)-th node 502 is mapped with $h(K_i)$, an (i+2)-th node 503 is mapped with $h(h(K_i))$, . . . , an (i+c−1)-th node 504 is mapped with $h^{(c-1)}(K_i)$.

In an exemplary embodiment of the present invention, the length c of the one-way key chain is predetermined, and the number of keys to be stored by each user depends on the length c. Accordingly, it is possible to construct the one-way key chains having the length c starting from all of the nodes, from all of the seed value keys assigned to the respective nodes, and to assign the keys in each constructed one-way key chain to respective nodes. Accordingly, each node would have c-ary keys. At this time, some nodes located near both end portion of the straight line can have the number of keys less than c.

Figure 6:
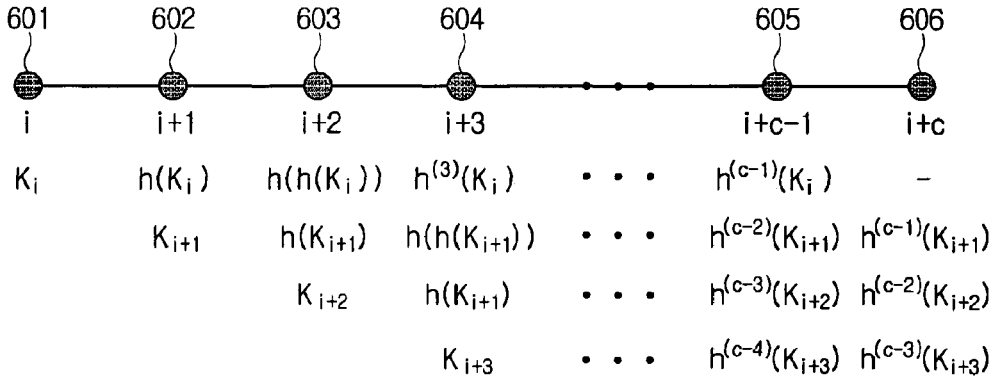
FIG. 6 is a view showing a method of assigning keys to each node on a straight line structure in accordance with an exemplary embodiment of the present invention.

FIG. 6 illustrates a method of assigning each key to each corresponding node on the straight line structure in accordance with an exemplary embodiment of the present invention. Referring to FIG. 6, the i-th node 601 is assigned the seed value key $K_i$. Meanwhile the (i+1)-th node 602 is assigned with a key $h(K_i)$ obtained by operating the one-way hash function h with the key $K_i$ and its own key $K_{i+1}$ that was assigned already. Further, the (i+2)-th node 603 is assigned a key $h(K_{i+1})$ obtained by applying the one-way hash function h to the keys which are assigned to the node (i+1) and its own key $K_{i+2}$.

That is, the (i+2) node 603 is assigned the key $h(h(K_i))$ obtained by applying the one-way hash function h twice, the key $h(K_{i+1})$ obtained by applying the one-way function h to the $K_{i+1}$, and its own seed value key $K_{i+2}$. In the same manner, the (i+c−1)-th node 605, which is the c-th node starting from the i-th node, is assigned the keys $h^{(c-1)}(K_i)$, $h^{(c-2)}(K_{i+1})$, $h^{(c-3)}, \ldots, K_{i+c-1}$.

Accordingly, each user corresponding to each node is assigned one key through c-ary keys as its secret keys depending on the position of each user.

Given that $K_{i,i}=K_i$, and $K_{i,j}=h^{(j-i)}(K_{i,j})$ for i≤j, a key set to be stored by a user $u_i$ can be expressed in Equation 1 as follows:

$$U_i=\{K_{k,i} \mid 0 \le i-k \le c, i \ge 1, k \ge 2\} \qquad \text{Equation 1}$$

Figures 7, 8:
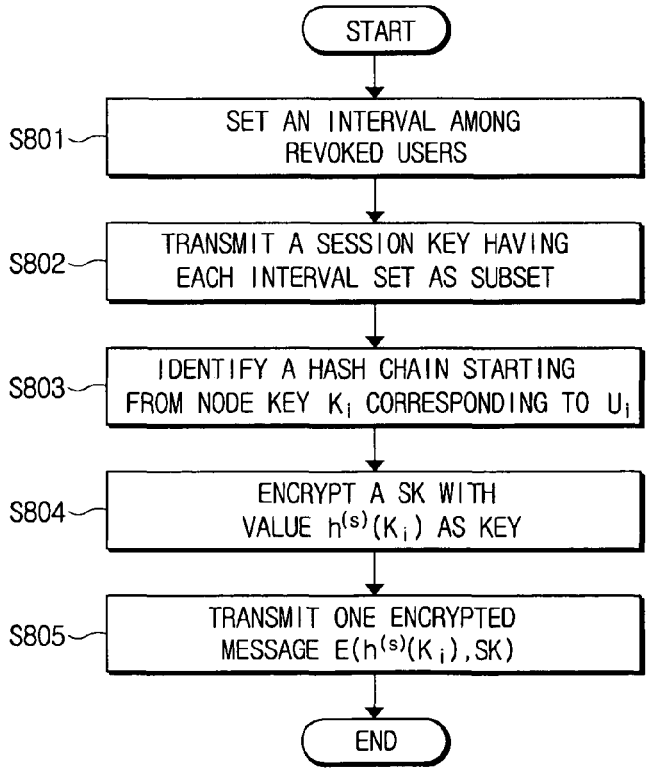
FIG. 7 is a view showing a result of assigning keys to each node on a straight line structure in accordance with an exemplary embodiment of the present invention.
FIG. 8 is a flow chart showing a procedure of transmitting a session key to users positioned between two revoked users in accordance with an exemplary embodiment of the present invention.

Further, the keys assigned to the respective nodes according to the Equation 1 are the same as in the table shown in FIG. 7. FIG. 7 is a view showing the keys assigned to each node on a straight line structure in accordance with an exemplary embodiment of the present invention. Referring to FIG. 7, it can be understood that a user $u_c$ is assigned c-ary keys, the keys 701 in FIG. 7.

Further, in the present invention, a scheme where all of the users are divided into at least one subset can be considered, and a session key is transmitted to each subset along with a message in this scheme.

FIG. 8 is a flow chart showing a procedure of transmitting a session key to an interval between two revoked users in accordance with an exemplary embodiment of the present invention. Referring to FIG. 8, a set of consecutive users put on between the revoked users is defined as an interval to transmit a session key (S801). Next, the session key is transmitted to each interval corresponding to each subset (S802).

At this time, one interval is set between two revoked users except for the case that the revoked users are consecutively arranged. Thus, it is possible to transmit the session keys to (r+1) intervals at most. However, when a maximum length of the interval is c, the transmission overhead becomes much greater in the interval longer than c.

Descriptions are now made on an exemplary method of setting an interval where privileged users are consecutively arranged. In a case that users $U_1$ through $U_{10}$ are present and the user $U_5$ is a revoked user, with the maximum length of the interval limited to 5, one interval from $U_1$ to $U_4$ and another interval from $U_6$ to $U_{10}$ are established.

Figure 9:
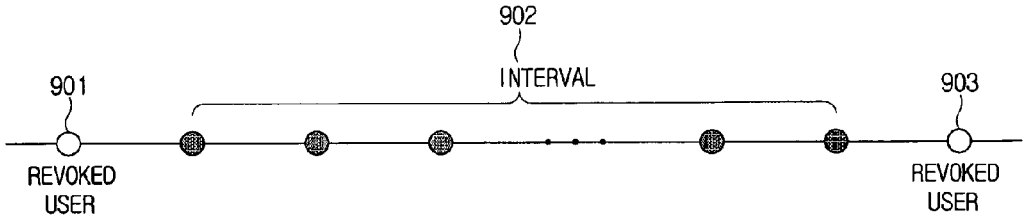
FIG. 9 is a view showing a definition of an interval in a straight line structure in accordance with an exemplary embodiment of the present invention.

In a case that users $U_1$ through $U_{10}$ are present and the users $U_1$ and $U_{10}$ are revoked users, with the maximum length of the interval limited to 5, one interval from $U_2$ to $U_6$ and another interval from $U_7$ to $U_9$ are established FIG. 9 is a view showing a definition of an interval in a straight line structure in accordance with an exemplary embodiment of the present invention. Referring to FIG. 9, a set of consecutive privileged users positioned between two revoked users 901 and 903 is defined as an interval 902.

Meanwhile, after the interval is set as described above, a one-way key chain starting from the node key $K_i$ of the user $U_i$ is located (S803). Next, the session key SK is encrypted using the last key $h^{(s)}(K_i)$ of the located one-way key chain and then transmitted to the corresponding interval (S804). At last, the encrypted message is transmitted (S805).

The method will be more detailed below. In order to transmit the session key SK to an interval $\{u_i, u_{i+1}, u_{i+2}, \ldots, u_{i+s}\}$ (here, the s is less than the c), the center uses the one-way key chain starting from the node key $K_i$ of the user $u_i$. The session key SK is encrypted by using the key $h^{(s)}(K_i)$ in the one-way key chain starting from the node key $K_i$, wherein the key $h^{(s)}(K_i)$ corresponds to the user $u_{i+s}$ and the encrypted session key is transmitted to the interval. That is, when E(K, M) is a secret key encryption algorithm with a key K, the message $E(h^{(s)}(K_i), SK)$ is transmitted to all of the users.

A user capable of decrypting the transmitted message based on keys previously allocated thereto as descried above is only the user who can obtain the key $h^{(s)}(K_i)$. Accordingly, only the users in the interval $\{u_i, u_{i+1}, u_{i+2}, \ldots, u_{i+s}\}$ can obtain the corresponding keys.

That is, since the user in the interval knows one key in the one-way key chain starting from the key $K_i$ and the key is positioned in the left side of the $h^{(s)}(K_i)$, the user can obtain the $h^{(s)}(K_i)$ by applying the one-way function h to his/her key.

In contrast, users in the left side of the interval among the users who are not in the interval cannot obtain a key related to the key $K_i$, so that they cannot obtain the key $h^{(s)}(K_i)$. Further, even though users in the right side of the interval may obtain some keys in the one-way key chain, they cannot obtain keys positioned in the left side of the one-way key chain due to uni-directionality of the one-way function.

Thus, although certain traitors who are not in the corresponding interval collude, it is impossible that they obtain the key $h^{(s)}(K_i)$. Accordingly, they can not decrypt the session key.

Figure 10:
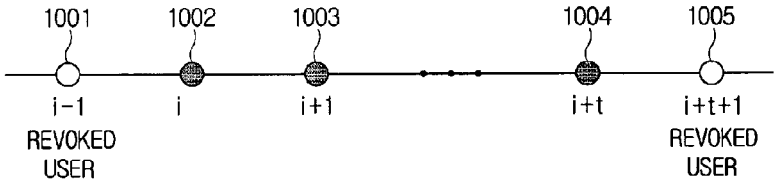
FIG. 10 is a view showing a method of transmitting a session key to an interval of a straight line structure in accordance with an exemplary embodiment of the present invention.

FIG. 10 is a view showing a method of transmitting a session key to an interval in a straight line structure in accordance with an exemplary embodiment of the present invention. Referring to FIG. 10, it is possible to simultaneously transmit the session key SK to the users in the interval in accordance with an exemplary embodiment of the present invention.

That is, assuming that revoked users are positioned on (i−1)-th node 1001 and (i+t+1)-th node 1005, respectively and (t+1) consecutive privileged users 1002, 1003 and 1004 are positioned between the two revoked users, it is possible to transmit only one secret key for only the privileged users. That is, assuming that E(K, m) is a secret key encryption scheme having K as a key, a header of the session key for the users $u_i, \ldots, u_{i+1}$ can be expressed as Equation 2 below.

$$\text{Header}=E(h^{(t)}(K_i),SK) \qquad \text{Equation 2}$$

Figure 11:
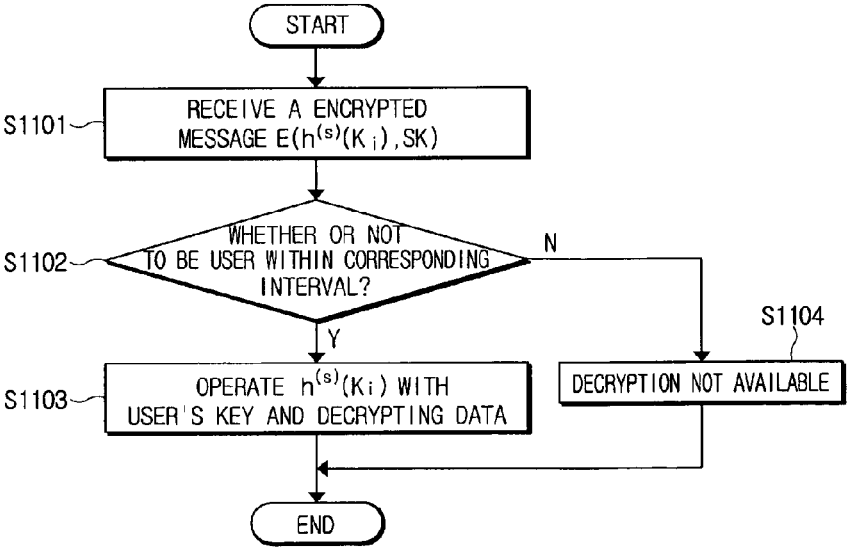
FIG. 11 is a flow chart showing a procedure of decrypting data using a session key received by a user of each node in accordance with an exemplary embodiment of the present invention.

FIG. 11 is a flow chart showing a procedure that users on each node decrypt data by using the session key received from the center with an exemplary embodiment of the present invention. Referring to FIG. 11, the only privileged users can decrypt the received data using the keys transmitted from the center according to the method described above. That is, when each user who received the message including the encrypted header is in the corresponding interval (S1102), the user performs decryption by operating the $h^{(s)}(K_i)$ using his/her own key (S1103). On the contrary, each user who is not in the corresponding interval can not decrypt the received data since they can not operate $h^{(s)}(K_i)$ (S1104).

In more detail, in FIG. 10, the users positioned in the left side of the i-th node 1002 cannot obtain the key $h^{(i+t)}(K_i)$ since they cannot obtain the key $K_i$. Further, while the users positioned in the right side of the (i+t) node can obtain the keys of rightward part of the one-way key chain starting from the key $K_i$, they cannot obtain the key $h^{(i+t)}(K_i)$ due to the uni-directional property of the one-way hash function.

On the other hand, all of the privileged users in the interval can obtain the key $h^{(i+t)}(K_i)$ by repeatedly applying the one-way function h to the key derived based on the key $K_i$ among their own keys.

Meanwhile, in a case that there are N total users including r revoked users, the transmission overhead can yield as follows.

First of all, each of the users should store c or less keys. At this time, the transmission overhead is $\{r+(N-2r)/c\}$ keys in the worst case. This case occurs when all of the revoked users are gathered in one portion on the straight line and the privileged users are gathered only in the other portion. The transmission overhead decreases when two or more revoked users consecutively are positioned. Accordingly, the case that revoked users and privileged users are positioned alternately should be considered. At this time, N/c is additionally needed since the maximum length of the interval to which keys can be transmitted by one transmission is set to c.

Further, the computation overhead of the users becomes operations of maximum c times for the one-way function and one operation of the secret key algorithm. In a case that N=1,000,000 and r=50,000, the computation overhead is obtained as shown in Table 1 below.

TABLE 1

| C (Storage cost) | Transmission overhead (worst case) | Ratio |
|---|---|---|
| 50 | 50,000 + 18,000 | 1.36r |
| 100 | 50,000 + 9,000 | 1.18r |
| 200(about 3K) | 50,000 + 4,500 | 1.09r |

Hereinafter, modifications of the basic exemplary embodiment of the present invention will be described below. In the basic exemplary embodiment, since as the length of the interval is limited to c, there is a problem that the transmission overhead becomes greater than r. Accordingly, a first modified exemplary embodiment is based on an idea that an interval is set to have a longer length than c, thereby transmitting keys to a longer interval by one transmission.

Further, a second modified exemplary embodiment applies a new one-way function to the node of the revoked user in order to reduce the transmission overhead to less than r. Still further, a third modified exemplary embodiment is a method derived by combining the first and second modified exemplary embodiments.

First Modified Exemplary Embodiment

In the basic exemplary embodiment described above, the transmission overhead is greater than r because the length of an interval is limited to c. Accordingly, to reduce the transmission overhead to as much as r, the first modified exemplary embodiment, which transmit the keys by one transmission to a longer interval than c is proposed.

In the first modified exemplary embodiment of the present invention, special nodes are set in a certain interval, for example, for every 3-th node. Then, special seed value keys randomly selected and different from the existing seed value keys are assigned to the respective special nodes, and a special node chain starting from one special node key is constructed.

Figure 12:
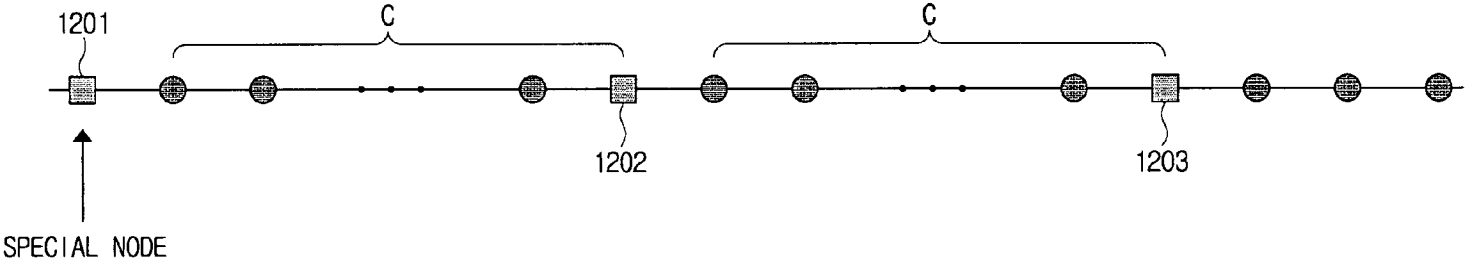
FIG. 12 is a view showing a definition of special nodes in a straight line structure in accordance with a first modified exemplary embodiment of the present invention.

FIG. 12 is a view showing definition of the special nodes in the straight line structure in accordance with the first modified exemplary embodiment of the present invention. Referring to FIG. 12, the special nodes 1201, 1202 and 1203 are set for every c-th node. The special nodes 1201, 1202 and 1203 are assigned new special seed value keys, respectively, and a one-way key chain having the length $c \times c_2$ is constructed by applying the keys.

In more detail, new special seed value keys are randomly selected and assigned to the special nodes 1201, 1202 and 1203, respectively, and a special node chain starting from each special node is constructed for the respective special seed value keys by applying a new one-way hash function.

At this time, the special node chain has the length $c \times c_2$, where $c_2$ is a new constant. Hereinafter, a method of assigning keys to all of the nodes, respectively, by using the constructed special node chain.

Figure 13:
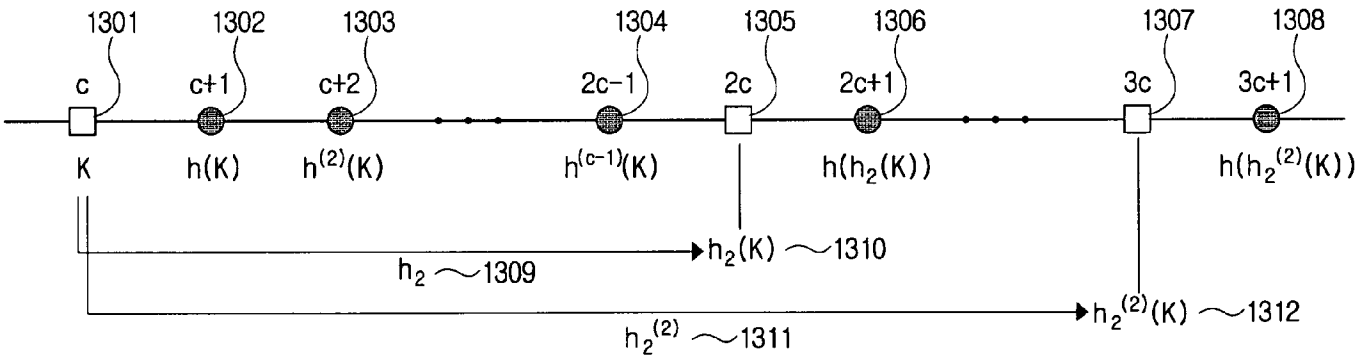
FIG. 13 is a view showing a method of assigning keys to each node on the straight line structure in accordance with the first modified exemplary embodiment of the present invention.

FIG. 13 shows a method of assigning the keys to the corresponding nodes on the straight line structure in accordance with the first modified exemplary embodiment of the present invention. A method of constructing a key chain in the first modified exemplary embodiment is basically the same as that of the basic exemplary embodiment described above. Assuming that an interval $\{u_i, u_{i+1}, u_{i+2}, \ldots, u_{i+s}\}$ starts at a special node and is arranged on the straight line in a range which is beyond the length c, key assignment to this interval is performed by the special node key chain starting from the key of the node $u_i$. In this modified exemplary embodiment, a scheme for encrypting the SK is the same as that of the basic exemplary embodiment of the present invention. That is, the SK is encrypted using the key corresponding to the node $u_{i+s}$ among the keys in the special node key chain starting from the key of the $u_i$ and then transmitted to each node in the interval $\{u_i, u_{i+1}, u_{i+2}, \ldots, u_{i+s}\}$.

Referring to FIG. 13, when the first special node 1301, the c-th node, is assigned a special node key K, the second special node 1305, the 2c-th node, is assigned a special node key $h_2(K)$ 1310 obtained by operating a one-way function $h_2$ 1309 with the special node key K. In the same manner, the third special node 1307, the 3c-th node, is assigned a special node key $h_2^{(2)}(K)$ 1312 obtained by operating the one-way function $h_2$ 1309 twice with the special node key K.

Accordingly, the (c+1)-th node 1202 is assigned the key h(K) obtained operating the one-way function h with the special seed value key K, and the (c+2)-th node 1303 is assigned the key $h^{(2)}(K)$ obtained by operating the one-way function h with the special seed value key K twice. In the same manner, the (2c+1)-th node 1306 is assigned the key $h(h_2(K))$ obtained by operating the one-way function h with the special seed value key $h_2(K)$ 1310 of the 2c-th node 1305. The (3c+1)-th node 1308 is assigned the key $h(h_2^{(2)}(K))$ obtained by operating the one-way function h with the special seed value key $h_2^{(2)}(K)$ 1312 of the 3c-th node 1307.

At this time, the (c+t)-th user stores his/her seed value key along with the key $h_2(K)$ when $1 \leq t \leq c$. Accordingly, each node should store total $c_2$ keys additionally.

As described above, in the first modified exemplary embodiment of the present invention, the number of the keys to be stored in each the node increases but the size of the session key to be transmitted by a center decreases.

Figure 14:
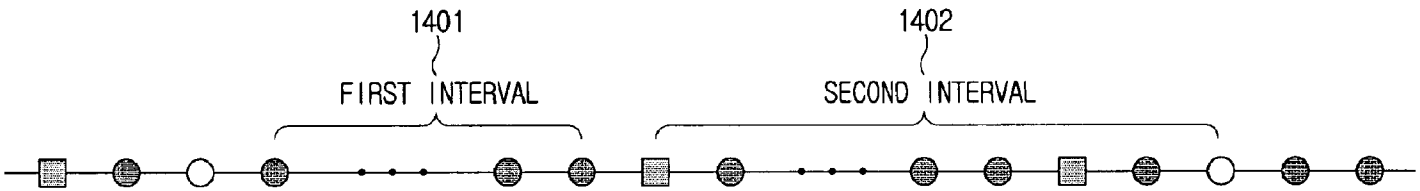
FIG. 14 is a view showing a method of dividing an interval to transmit a session key in accordance with the first modified exemplary embodiment of the present invention.

FIG. 14 shows a method of dividing an interval to transmit a session key in accordance with the first modified exemplary embodiment of the present invention. Referring to FIG. 14, in a case that a number of privileged users are consecutively arranged, they can be divided into only two intervals 1401 and 1402 to be provided with the session key.

Figure 15:
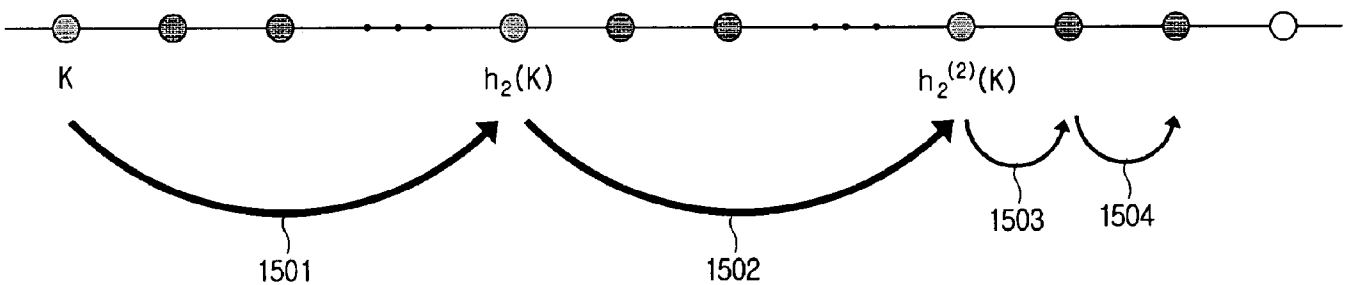
FIG. 15 is a view showing a method of transmitting a session key when an interval is divided into a plurality of sub-interval in accordance with the first modified exemplary embodiment of the present invention.

FIG. 15 shows a method of transmitting a session key to a plurality of intervals in accordance with the first modified exemplary embodiment of the present invention. Referring to FIG. 15, in a case that the privileged users are divided into four intervals 1501, 1502, 1503 and 1504, the session key is constructed like $E(h^{(2)}h_2^{(2)}(K), SK)$ so that only the privileged users can decrypt the session key.

Accordingly, the computation overhead can be reduced by applying the function $h_2$ in accordance with the first modified exemplary embodiment of the present invention. That is, maximum $(c+c_2)$ times of computations of the one-way function are needed.

According to the first modified exemplary embodiment described above, although the storage overhead of the user increases somewhat compared with the basic exemplary embodiment, it is possible to remarkably reduce the transmission overhead if the number of the revoked users is not so many.

Second Modified Exemplary Embodiment

According to the first modified exemplary embodiment, it is possible to obtain the transmission overhead which is approximately the same as r. That method shows the best result in the transmission overhead among the currently known methods such as the SD method with the transmission overhead of 2r−1. A second modified exemplary embodiment to be described hereinafter can reduce the transmission overhead to as much as less than r.

The basic concept of the second modified exemplary embodiment is as follows. In a case that a set of users positioned between two revoked users is regarded as an interval, the total number of intervals can never be below r in the worse case. In such cases, since one transmission should be made for each interval, it is impossible that the transmission overhead becomes less than r. Thus, it is necessary to alter a method of defining an interval.

Accordingly, a transmission interval can be set by including more than one revoked user in the second modified exemplary embodiment of the present invention. The following description provides an example where an interval can include one revoked user. Although in the example of the second modified exemplary embodiment, an interval with only one revoked user is disclosed, but it is beyond doubt that an interval with more than one revoked user can be considered. If one interval includes total 3 revoked users, it is possible to reduce the transmission overhead down to r/2 in an ideal case.

Figure 16:
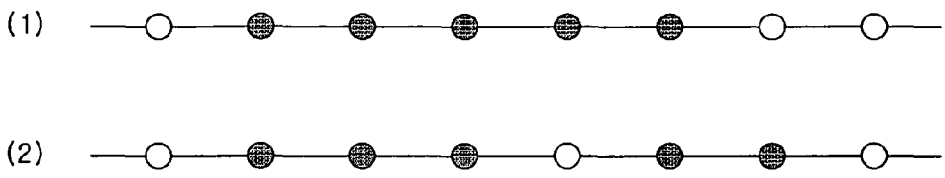
FIG. 16 is a view showing a method of defining an interval in accordance with a second modified exemplary embodiment of the present invention.

FIG. 16 shows a method of defining an interval in accordance with the second modified exemplary embodiment of the present invention. According to the second modified exemplary embodiment of the present invention, since the interval is set to include revoked users, the transmission overhead decreases and the storage overhead increases. That is, it is possible to transmit a session key to the interval between two revoked users at a time.

If an interval includes one revoked user, two cases can be considered as shown in FIG. 16. In the case (1) in FIG. 16, the key transmission can be performed as disclosed in the basic exemplary embodiment. In the case (2) in FIG. 16, however, a key transmission procedure follows the second modified exemplary embodiment of the present invention.

The transmission of a session key for the interval as in the second case (2) is performed as follows. At this time, a new one-way hash function g is required in accordance with the second modified exemplary embodiment of the present invention. That is, assuming that the interval $\{u_i, u_{i+1}, u_{i+2}, \ldots, u_{i+s}\}$ includes a revoked user $u_{i+j}$, here the length of an interval can not exceed c, the center encrypts the session key SK using the key $h^{(s-j)}gh^{(j-2)}(K_i)$.

FIG. 16 illustrates an example of the interval with only one revoked user. However, as mentioned above, this second modified exemplary embodiment as illustrated in FIG. 16 can be applied to the case that an interval includes two or more revoked users.

Figure 17:
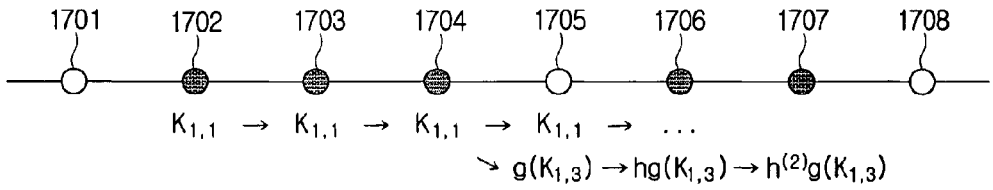
FIG. 17 is a view showing a method of assigning keys to each node of a straight line structure in accordance with the second modified exemplary embodiment of the present invention.

FIG. 17 shows method of assigning keys to corresponding nodes 1701 through 1708 on a straight line structure in accordance with the second modified exemplary embodiment of the present invention. Referring to FIG. 17, until revoked users corresponding to the nodes 1702, 1703 and 1704 are found, a one-way key chain are modified by applying the one-way hash function h in the right direction along the one-way key chain. At the node 1705 of the revoked user $u_{i+j}$, another one-way hash function g, rather than the one-way hash function h, is applied to modify the one-way key chain.

After the revoked users 1706 and 1707, the one-way key chain is constructed by generating key values using one-way hash function h again. For the transmission, the session key SK is encrypted with the key corresponding to the node of the last user.

At this time, since the two one-way functions h and g are publicly known, users positioned in the left side of the revoked user can easily compute the key used for encryption. However, the revoked user $u_{i+j}$ can not compute the subsequent keys because the revoked user does not know the key $hg^{(j-1)}(K_i)$. That is why the center keeps the key $hg^{(j-1)}(K^i)$ secret.

Meanwhile, users positioned in the right side of the revoked user have to additionally store the key corresponding to their positions in the key chain, respectively. At this time, in a case that the length of the interval is set to c, the number of the interval is 1+2+3+. . . +(c−2). That is, each user has to store (c−1)(c−2)/2 keys additionally.

In the second modified exemplary embodiment of the present invention described above, although the total storage overhead is c+(c−1)(c−2)/2, i.e. $O(c^2)$, but the transmission overhead is r/2+(N−2r)/c. That is, while the basic exemplary embodiment has the transmission overhead of r+(N−2r)/c, this second modified exemplary embodiment has the transmission overhead of r/2+(N−2r)/c at most. Further, the computation overhead becomes the maximum c times of computations of one-way function like the basic exemplary embodiment.

In the case of N=1,000,000 and r=50,000, the computation and transmission overheads are as in Table 2.

TABLE 2

| c | Storage overhead | Transmission overhead (worst case) | Ratio |
|---|---|---|---|
| 64 | 1,955 | 25,000 + 14,000 | 0.78r |
| 100 | 4,951 | 25,000 + 9,000 | 0.68r |

Referring to Table 2, although the first term r in the transmission overhead of the basic exemplary embodiment is remarkably reduced to π/2 in this exemplary embodiment, the second term (N−2r)/c in the transmission overhead increases.

Meanwhile, the method of the second modified exemplary embodiment described above can extend to general cases. That is, as the storage overhead increases to $O(c^3)$, the key transmission can be implemented to transmit the key to an interval including three revoked users at a time. Accordingly, the method can also be applied to the interval including a plurality of revoked users as well as one revoked user as described above.

Third Modified Exemplary Embodiment

A third modified exemplary embodiment of the present invention is derived by combining the first and second modified exemplary embodiments. In this case, it is the worst case when every interval having a length c includes one revoked user. In a case that an interval having the length less than c includes two or more revoked users, the transmission for the two revoked users can be carried out at a time by using the second modified described above. The transmission overhead and storage overhead in such worst case are r/2+(N−2r)/2(c−2) and $c+c_2+(c-1)(c-2)/2$, respectively.

The transmission overhead r/2+(N−2r)/2(c−2) can be applied to the case that r is greater than N/c. If r is smaller than N/c, different results are obtained. For example, assuming that r equals zero, the transmission overhead becomes $N/(c\times c_2)$. At this time, as r gradually increases, the transmission is needed once for the interval including the revoked users and having the length c. Further, since the method of the first modified exemplary embodiment is applied to the other intervals, the transmission overhead becomes approximately $r+(N-cr)/(c\times c_2)$.

That is, the transmission overhead forms a straight line with the initial value of $N/(c\times c_2)$ and the slope of value 2. The transmission overhead increases along the straight line and then changes to r/2+(N−2r)/2(c−2) when r is N/c which is the turning point.

According to the third modified exemplary embodiment, although the storage overhead of the user increases somewhat in comparison with the basic exemplary embodiment, it is possible to remarkably reduce the transmission overhead in a case that the number of the revoked users is not so many.

Fourth Modified Exemplary Embodiment

The fourth modified exemplary embodiment of the present invention proposes a method for applying the basic exemplary embodiment of the straight line structure and the first to third modified exemplary embodiments into a circular structure.

First, it is possible to easily reconstruct the straight line structure in the exemplary embodiments described above into a circular structure. That is, considering a straight line L including N users from $u_1$ to $u_N$, the straight line structure turns into a circular structure by connecting both ends of the straight line L.

All of the method of defining the interval described above will be applied to this circular structure. For example, a one-way key chain starting from a user $u_N$ can be constructed.

In the basic exemplary embodiment having the straight line structure described above, the one-way key chain starting from the user $u_N$ may have one key $K_{N,N}$. Meanwhile, the one-way key chains starting from the user $u_N$ have c-ary keys as expressed in Equation 3 because one-way key chains continue by gluing the user $u_N$ with the user $u_1$ in the circular structure.

$$K_{N,N}, K_{N,1}, K_{N,2}, K_{N,3}, \ldots K_{N,c-1} \quad \text{Equation 3}$$

By generalizing the Equation 3, the one-way key chain starting from the user $u_i$ can be expressed as Equation 4.

$$K_{i,i}, K_{i,i+,1(mod\ N)}, \ldots, K_{i,i+c-1(mod\ N)} \quad \text{Equation 4}$$

Specifically, in the fourth modified exemplary embodiment, provided that the maximum length of the interval consisting of the consecutive privileged users is c, each user stores one to c-ary keys depending on the location of the user in the straight line structure, whereas each user stores c-ary keys in the circular structure.

FIG. 18 depicts a method of assigning keys to each node on a circular structure in accordance with the fourth modified exemplary embodiment of the present invention. Referring to FIG. 18, in the fourth modified exemplary embodiment of the present invention, provided that 10 nodes form a circular group and the maximum length of an interval consisting of consecutive privileged users is 5, each node stores five keys.

As the length of the interval is set to c as mentioned in the first modified exemplary embodiment, to prevent the transmission overhead from exceeding r, it is possible to apply the method of transmitting the key values to the long interval at one time in the circular structure.

Further, to reduce the transmission overhead less than r as in the second modified exemplary embodiment, the method of applying the new one-way function starting from the position of the revoked users is applicable to the circular structure. Likewise, the third modified exemplary embodiment combining the first and second modified exemplary embodiments is also applicable to the circular structure.

Fifth Modified Exemplary Embodiment

The fifth modified exemplary embodiment of the present invention suggests a layered circular structure.

Figure 19:
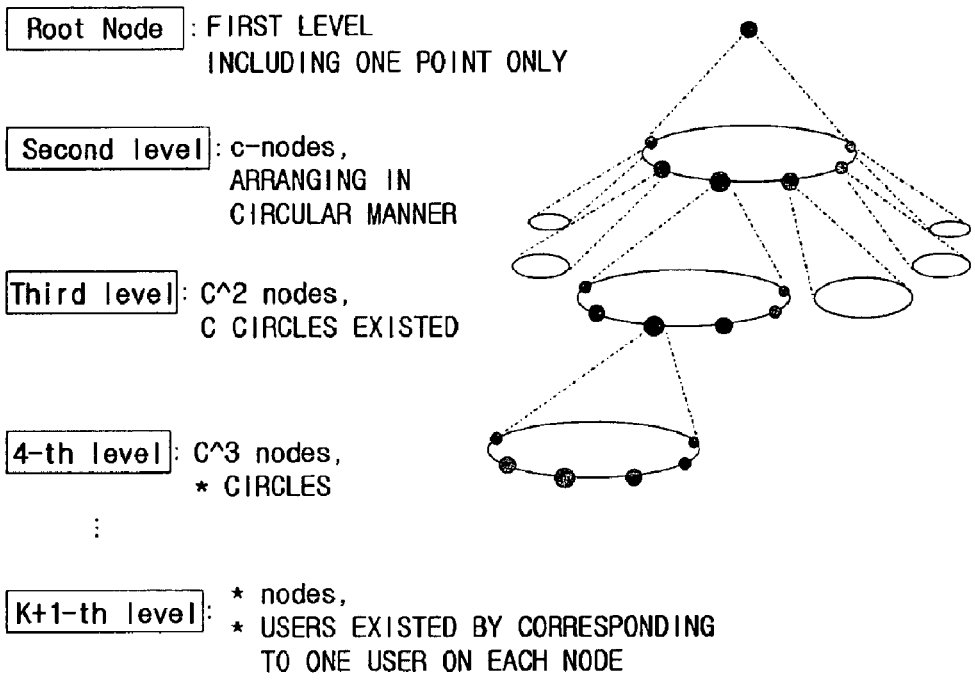
FIG. 19 is a view showing a layered structure with circular node groups in accordance with an exemplary embodiment of the present invention.

FIG. 19 shows a layered structure with circular node groups in accordance with an exemplary embodiment of the present invention.

Referring to FIG. 19, each circular node group in the layered structure includes c nodes. Each user corresponds to each leaf, that is, each circular structure, in the layered structure. If the layered structure has 16 levels excluding the root node, the layered structure can correspond to $c^{16}$ users.

Accordingly, it is possible to construct the circular structures having the key chains described above for all group nodes at the layers. At this time, each user corresponding to each node has all keys assigned to his/her parent node.

In this structure, each node having a child node with at least one revoked user is considered as a revoked node. Accordingly, for the encryption, the center marks the revoked users, first. Thereafter, the center first marks the revoked nodes in the encryption. The center marks the parent nodes of the revoked nodes throughout the layered structure.

Such a procedure is performed up to the root node. If there is at least one revoked node, the root node becomes the revoked node.

After marking the revoked nodes, the center sets intervals in each layer. As shown in FIG. 19, only one node is included above the layer 0. The center sets cyclic intervals in the circular group on the layer 0, and encrypts the session key using interval keys for the set cyclic intervals. Next, the center considers on the layer 1 only the circular groups corresponding to the children of the revoke nodes of the layer 0. Such a procedure is performed as far as the layer 15.

For example, in a case where there is one revoked user in an interval, a revoked node is marked in every layer while marking the revoked users. Further, in the encryption step, since there is a revoked node in the layer 0, the center encrypts the session key with the interval key of the cyclic interval excluding the revoked node. Meanwhile, the center considers only one circular group corresponding to the child of the revoked node in the layer 0 for the layer 1.

Nodes corresponding to the children of the privileged nodes and forming the cyclic group, can obtain the session keys assigned to their parent nodes. Accordingly, the center can complete the encryption for entire layered structure by 16 times of encryptions.

While the fourth modified exemplary embodiment can carry out the encryption for more users and thus requires more keys compared with former exemplary embodiments, it can remarkably reduce the transmission overhead, particularly compared with the second modified exemplary embodiment.

Provided that the layer of the fourth modified exemplary embodiment is a layer k and the number of nodes in each circular group is c, the storage overhead of each user in the fourth modified exemplary embodiment is $kc+(c-1)(c-2)/2$, and keys increase as many as $(k-1)c$.

Meanwhile, the transmission overhead becomes about $r/2+3N/4c$ for $c^{k-1}/2<r$. It can be understood that the fourth modified exemplary embodiment has less transmission overhead than that of the second modified exemplary embodiment for $r<N/6$.

Further, while the method of the four modified exemplary embodiment described above is applied to the case with the interval including one revoked user (1-punctured), it is obvious that the method can also be applied to the case with the interval including a plurality of revoked users (p-punctured) as described in the second modified exemplary embodiment. Further, it is possible to use the method of setting intervals, each with revoked users, and transmitting session keys with respect to the layered structure with more layers.

Hereinbefore, each of exemplary embodiments in accordance with the present invention has been described. Meanwhile, in practically applying the exemplary embodiments described above to the broadcast encryption, it is hardly considered that all users are joined initially at the same time. That is, the center has to reserve the keys for all potential users to be joined in the future, and some reserved keys corresponding to the potential users should be regarded as revoked. Otherwise, newly joined users can recover messages transmitted previously.

Considering that the transmission overhead depends on the r, it can be much burden on the center.

Accordingly, it is very important to add new keys when they are needed as new users join in the aspect of the transmission overhead instead of presetting the keys corresponding to potential users in advance. The exemplary embodiments proposed above can easily add new nodes at the end of the straight line whenever the new users newly join. At this time, since the computation overhead increases due to selection of several new random keys as many as the number of new subscribers and the increased computation times of the function, adding new users is efficiently capable without affecting existing users' keys.

On the contrary, in the view of replacement of the users, it is related to maintenance of the system as time passes. The nodes that have belonged to the revoked users are permanently kept unused after the users arranged to the nodes are revoked once. Accordingly, in the system of which the transmission overhead depends on the r, the transmission overhead remarkably increases after a long time passes.

In such case, it is necessary to reduce the number of nodes inoperable by deleting the keys of the revoked users, and then arrange new users to the nodes inoperable which have belonged to the revoked users. In the conventional interpolation method, replacement of users can be easily performed but it is very hard issue in the BE scheme based on the layered tree structure. In the case of the SD, to replace only one user, every user keys should be updated since key of the root node should be changed.

Meanwhile, in the exemplary embodiments of the present invention describe above, the user replacement is more capable in comparison with the methods based on the tree structure as the SD and the like. That is, in a case of the basic exemplary embodiment, one user can be replaced by updating keys of 2c total users.

Traitors refer to a privileged user who helps unprivileged users use messages by disclosing his/her secret key. Traitor tracing is an algorithm to locate the privileged user who disclosed his/her key when at least one unprivileged users are found. Various results for such a traitor tracing are known.

It is known that the traitor tracing can basically be used in a case that each user's keys can be discriminated with one another and a new key cannot be derived from many user's keys. Meanwhile, the traitor tracing can be applied in the proposed exemplary embodiments of the present invention described above since they fulfill the conditions of the traitor tracing.

At the same time, it is possible to reduce the number of secret keys of each user to 2 by modifying the basic exemplary embodiment to a method using public keys. The public keys needed in this case are $O(c^2)$. Such a modification can be very useful when it is applied to application fields where the size of the pubic key is not limited.

In conclusion, the result of comparing CS and SC methods that are the currently most effective BE scheme among various broadcast encryption methods with the present invention is shown as follows. Here, N=1,000,000 and r=50,000 as is in the result described above.

TABLE 3

| | C | C2 | Storage overhead | Transmission overhead (worst case) |
|---|---|---|---|---|
| Basic exemplary embodiment | 200 | | 200(2K) | 50,000 + 4,500(1.1r) |
| Second modified exemplary embodiment | 64 | | 1,955 | 25,000 + 14,000(0.78r) |
| Third modified exemplary embodiment | 64 | 20 | 1,955 | 25,000 + 7,260(0.64r) |
| | 100 | 100 | 5,151 | 25,000 + 4,500(0.59r) |
| CS | | | 20 | r × (log(N/r)(4r) |
| SD | | | 200 | 100,000(2r) |

Referring to Table 3, in accordance with the exemplary embodiments of the present invention, it is possible to reduce the transmission overhead that is most important issue in the broadcast encryption to below r. That is, it can be understood that the transmission overhead in the exemplary embodiments of the present invention is remarkably reduced compared with the SD method that is known as the best method currently. At the same time, the exemplary embodiments of the present invention meet many conditions needed to make applications practically as described above.

As described above, according to the present invention, it is possible to reduce the transmission overhead that is most important matter in the broadcast encryption to less than r. Further, there is an advantage that the transmission overhead of the exemplary embodiments of the present invention is remarkably reduced compared with the SD method that is known as the best method currently.

Further, according to the present invention, there is an advantage that it is impossible to derive a new key although many users collude and it is possible to do traitor tracing since keys of the colluded users, which are made by an illegal decoder, is used. Furthermore, it is possible to freely add as many users as desired at the last of the sequence.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of managing a user key for a broadcast encryption, the method comprising:

assigning node path identifiers (IDs) to nodes which are arranged in sequence;

assigning random seed value keys to the nodes according to the node path IDs;

generating key values by repeatedly applying a hash function to the assigned random seed value keys; and assigning the generated key values to the nodes in sequence.

2. The method of claim 1, wherein an encryption key for an interval formed with N-ary nodes which are arranged in sequence is generated by repeatedly applying the hash function N−1 times to a seed value key which is assigned to a first node in the interval.

3. The method of claim 2, wherein the interval is a set of consecutive non-revoked nodes.

4. The method of claim 2, wherein the interval includes more than one revoked node and an independent hash function is applied to the revoked node.

5. A method of managing a user key for a broadcast encryption, the method comprising:

assigning random seed value keys to nodes which are sequentially arranged;

generating first key values by repeatedly applying a first hash function to the assigned random seed value keys;

assigning the first key values to the nodes in sequence;

setting special nodes in a certain interval among the nodes which are sequentially arranged;

assigning special seed value keys to the special nodes;

generating second key values by repeatedly applying a second hash function to the assigned special seed value keys; and assigning the second key values to the special nodes in sequence.

6. The method of claim 5, wherein, when a special node key K is assigned to a first special node of the special nodes, a second key value which is obtained by applying the second hash function to the special node key K is assigned to a second special node located away from the first special node in the certain interval.

7. The method of claim 5, wherein an encryption key for an interval formed with N-ary nodes which are arranged in sequence is generated by repeatedly applying the hash function N−1 times to a seed value key which is assigned to a first node in the certain interval.

8. The method of claim 7, wherein the certain interval is a set of consecutive non-revoked nodes.

9. The method of claim 7, wherein the interval includes more than one revoked node and an independent hash function is applied to the revoked node.

10. A method of managing a user key for a broadcast encryption, the method comprising:

assigning node path identifiers (IDs) to nodes configured as a circular group;

assigning random seed value keys to the nodes according to the node path IDs;

generating key values by repeatedly applying a hash function to the assigned random seed value keys; and assigning the generated key values to the nodes in a cyclic way.

11. The method of claim 10, wherein an encryption key for a cyclic interval constructed with N-ary nodes in the circular group is generated by repeatedly applying the hash function N−1 times to a seed value key which is assigned to a first node in the interval.

12. The method of claim 11, wherein the cyclic interval is a set of consecutive non-revoked nodes.

13. The method of claim 10, wherein a layered structure of circular groups is formed by linking nodes configuring a new circular group below each node configuring the circular group.

14. The method of claim 13, wherein the layered structure has 16 layers.

15. The method of claim 13, wherein a number of nodes in the circular groups is identical.

16. The method of claim 13, wherein a node having at least one revoked node is regarded as a revoked node in the layered structure.

17. The method of claim 10, wherein the cyclic interval formed with the N-ary nodes in the circular group includes more than one revoked node and an independent hash function is applied to the revoked node.

18. The method of claim 10, wherein N-ary nodes form the circular group and are assigned the node path IDs from 0 to N−1.

19. A method of managing a user key for a broadcast encryption, the method comprising:

assigning random seed value keys to nodes configured as a circular group;

generating first key values by repeatedly applying a first hash function to the assigned random seed value keys;

assigning the first key values to the nodes in a cyclic way;

setting special nodes in a certain interval among the nodes;

assigning random special seed value keys to the special nodes;

generating second key values by repeatedly applying a second hash function to the assigned random seed value keys; and assigning the second key values to the special nodes in a cyclic way.

20. The method of claim 19, wherein, if a special node key K is assigned to a first special node of the special nodes, a second key value which is obtained by applying the second hash function to the special node key K is assigned to a second special node located away from the first special node at the certain interval.

21. The method of claim 19, wherein an encryption key for an interval formed with N-ary nodes which are arranged in sequence is generated by repeatedly applying the hash function N−1 times to a seed value key which is assigned to a first node in the interval.

22. The method of claim 21, wherein the cyclic interval is a set of consecutive non-revoked nodes.

23. The method of claim 21, wherein the cyclic interval includes more than one revoked node and an independent hash function is applied to the revoked node.

24. A key assigning method comprising:

assigning node path identifiers (IDs) to nodes which are arranged in sequence;

a first assigning of a first seed to one of a plurality of first keys of a first node in a first group; and a second assigning of a result of applying a hash function at least once to a second seed assigned to a second node in the first group, to another one of the plurality of first keys of the first node in the first group.

25. The method of claim 24, wherein the first seed and the second seed are randomly generated and are independent from one another.

26. The method of claim 24, wherein the hash function is HBES SHA-1.

27. The method of claim 24, wherein the first group consists of t nodes, the first node is arranged at a first position in the first group, the second node is arranged at a second position in the first group, and the second assigning comprises applying the hash function (t−1) times to the second seed.

28. The method of claim 24, wherein the first node and the second node in the first group have a same parent node.

29. The method of claim 24, further comprising performing the first assigning and the second assigning to other groups different from the first group.

30. The method of claim 29, wherein the first group and the other groups are arranged in a layered tree structure.

31. The method of claim 30, wherein the tree structure consists of 16 layers.

32. The method of claim 30, wherein a leaf node of the layered tree structure has a key set comprising keys assigned to the leaf node and keys assigned to a parent node of the leaf node.

33. A key assigning method comprising:

a first assigning of a first seed to one of a plurality of first keys of a first node in a first group; and a second assigning of a result of applying a hash function at least once to a second seed assigned to a second node in the first group, to another one of the plurality of first keys of the first node in the first group, wherein the first group consists of t nodes, the first node is an $a^{th}$ node in the first group, the second node is a $b^{th}$ node in the first group, and the second assigning comprises applying the hash function [(a+t−b)mod t] times to the second seed.

34. The method of claim 33, further comprising a third assigning of a result of applying the hash function at least once to a third seed assigned to a third node in the first group, to another one of the plurality of first keys of the first node.

35. The method of claim 34, wherein the third node is a $c^{th}$ node in the first group, and the third assigning comprises applying the hash function [(a+t−c)mod t] times to the third seed.

36. The method of claim 35, wherein the first group consists of t nodes, the first node is arranged at a first position in the first group, the second node is arranged at a second position in the first group, the third node is arranged at a third position in the first group, the second assigning comprises applying the hash function (t−1) times to the second seed, and the third assigning comprises applying the hash function (t−2) times to the third seed.

37. A key assigning method comprising:

a first assigning of a first seed to one of a plurality of first keys of a first node in a first group;

a second assigning of a result of applying a hash function at least once to a second seed assigned to a second node in the first group, to another one of the plurality of first keys of the first node in the first group;

a third assigning of the second seed to one of second keys of the second node; and a fourth assigning of a result of applying the hash function at least once to the first seed assigned to the first node, to another one of the second keys of the second node, wherein the first group consists of t nodes, the first node is an $a^{th}$ node in the first group, the second node is a $b^{th}$ node in the first group, and the fourth assigning comprises applying the hash function [(b+t−a)mod t] times to the first seed.

38. The method of claim 37, wherein the first group consists of t nodes, the first node is arranged at a first position in the first group, the second node is arranged at a second position node in the first group, and the fourth assigning comprises applying the hash function once to the first seed.

39. The method of claim 37, further comprising:

a fifth assigning of a result of applying the hash function at least once to a third seed assigned to a third node in the first group, to other one of the second keys of the second node.

40. The method of claim 39, wherein the third node is a $c^{th}$ node in the first group, and the fifth assigning comprises applying the hash function [(b+t−c)mod t] times to the third seed.

41. A key assigning method comprising:

assigning node path identifiers (IDs) to group nodes which are arranged in sequence;

a first assigning of a random seed to one of a plurality of keys of a node of the group;

a second assigning of results of applying a hash function a different number of times to seeds assigned to remaining nodes of the group, to remaining keys of the plurality of keys of the node of the group; and performing the first assigning and the second assigning for the remaining nodes of the group.

42. A key assigning method comprising:

assigning node path identifiers (IDs) to group nodes which are arranged in sequence;

assigning a random seed to one of a plurality of keys of a node of the group; and assigning results of applying a hash function a different number of times to seeds assigned to remaining nodes of the group, to remaining keys of the node of the group.

43. An encryption method comprising:

identifying consecutive approved nodes from among a plurality of nodes arranged in sequence, as an interval;

determining a key to which a hash function is applied (n−1) times to a seed assigned to a first node of the nodes included in the interval, wherein n is a number of the consecutive nodes included in the interval; and encrypting another key with the determined key.

44. The encryption method of claim 43, further comprising:

transmitting the encrypted another key to one of consecutive approved nodes of another interval.

45. An encryption method comprising:

receiving a first key encrypted with a second key to which a hash function is applied (n−1) times to a seed assigned to a first node in an interval which includes consecutive approved nodes from among a plurality of nodes arranged in sequence, wherein n is a number of the consecutive nodes included in the interval;

computing the second key which encrypted the first key; and decoding the encrypted first key with the computed second key.

46. The encryption method of claim 45, wherein the receiving comprises receiving the first key encrypted with the second key at a node of another interval comprising consecutive approved nodes of the plurality of nodes.

*47. A key assigning method comprising:*

*assigning node path identifiers (IDs) to group nodes arranged in sequence;*

*assigning a seed to one of keys of a node of the group nodes according to the node paths IDs; and*

*assigning results to remaining keys of the node of the group nodes, wherein the results indicate a hash function applied a number of times to seeds assigned to remaining nodes.*

*48. An encryption method comprising:*

*identifying as an interval consecutive approved nodes from among nodes arranged in sequence;*

*determining a key to which a hash function is applied a number of times to a seed assigned to a first node of the nodes in the interval, wherein the number is one less a number of the consecutive nodes included in the interval; and*

*encrypting another key with the determined key.*

*49. The method of claim 48, further comprising:*

*transmitting the encrypted another key to one of consecutive approved nodes of another interval.*

*50. An encryption method comprising:*

*receiving a first key encrypted with a second key to which a hash function is applied a number times to a seed assigned to a first node in an interval comprising consecutive approved nodes from among nodes arranged in sequence, wherein the number is one less a number of the consecutive nodes included in the interval; and*

*computing the second key to decode the encrypted first key.*

*51. The method of claim 50, wherein the receiving comprises receiving the first key encrypted with the second key at a node of another interval comprising consecutive approved nodes of the nodes.*

* * * * *